US012768394B2

(12) United States Patent
Aggarwal et al.

(10) Patent No.: US 12,768,394 B2
(45) Date of Patent: Oct. 20, 2026

(54) MAGNETIC-ASSISTED SUCTION CUP MOUNTING ASSEMBLY AND METHOD

(71) Applicant: HEATH CONSULTANTS INCORPORATED, Houston, TX (US)

(72) Inventors: Vineet Aggarwal, Richmond, TX (US); Alan Kenneth Stratton, Milford, NH (US); Nathan Michael Blanchard, Manchester, NH (US)

(73) Assignee: HEATH CONSULTANTS INCORPORATED, Houston, TX (US)

( * ) Notice: Subject to any disclaimer, the term of this patent is extended or adjusted under 35 U.S.C. 154(b) by 95 days.

(21) Appl. No.: 19/005,997

(22) Filed: Dec. 30, 2024

(65) Prior Publication Data

US 2025/0129814 A1 Apr. 24, 2025

Related U.S. Application Data

(62) Division of application No. 18/139,006, filed on Apr. 25, 2023, now Pat. No. 12,247,610.

(Continued)

(51) Int. Cl.

*F16B 47/00* (2006.01)
*F16B 1/00* (2006.01)
*F16M 13/02* (2006.01)

(52) U.S. Cl.

CPC ................ *F16B 47/00* (2013.01); *F16B 1/00* (2013.01); *F16M 13/022* (2013.01); *F16B 47/006* (2013.01); *F16B 2200/83* (2023.08)

(58) Field of Classification Search

CPC ............................... F16B 47/00; F16B 47/006

(Continued)

(56) References Cited

U.S. PATENT DOCUMENTS 12,247,610 B2 * 3/2025 Aggarwal ............... F16B 47/00
12,638,039 B2 * 5/2026 Aggarwal ............... F16B 47/00

(Continued)

FOREIGN PATENT DOCUMENTS

CN 101876335 A 11/2010
JP H0567518 A 3/1993

(Continued)

OTHER PUBLICATIONS

International Search Report and Written Opinion issued in International Application No. PCT/US2023/019791, report mail date Aug. 29, 2023; pp. 1-10.

*Primary Examiner* — Alfred J Wujciak
(74) *Attorney, Agent, or Firm* — Douglas W. Rommelmann; Grable Martin PLLC

(57) ABSTRACT

A magnetic-assisted suction cup mounting assembly and method for semi-permanently attaching to a ferrous material surface comprises a suction cup and at least one magnet spatially arranged with respect to the suction cup and providing additional fixturing of the suction cup to the ferrous material surface. One method for semi-permanently attaching the mounting assembly to the ferrous material surface comprises positioning a plurality of magnets in a raised position above a peripheral edge surface of a suction cup, positioning the suction cup on the ferrous material surface and drawing a vacuum between the suction cup and the ferrous material surface. Then repositioning the plurality of magnets to a lowered position in contact with the ferrous material surface.

15 Claims, 10 Drawing Sheets

Related U.S. Application Data

(60) Provisional application No. 63/334,547, filed on Apr. 25, 2022.

(58) Field of Classification Search
USPC ... 248/683, 467, 205.5, 205.6, 205.7, 206.5, 248/309.4, 309.3
See application file for complete search history.

(56) References Cited

U.S. PATENT DOCUMENTS

| | | | |
|---|---|---|---|
| 2016/0102808 A1 | 4/2016 | Bray et al. | |
| 2019/0177047 A1 | 6/2019 | Doyle et al. | |
| 2020/0142529 A1 | 5/2020 | Nugraha | |
| 2021/0180642 A1 | 6/2021 | Botkus et al. | |
| 2022/0307544 A1 | 9/2022 | Bleckat et al. | |
| 2024/0034246 A1* | 2/2024 | Aggarwal | B60R 11/02 |

FOREIGN PATENT DOCUMENTS

| | | | |
|---|---|---|---|
| JP | 2020515464 | A | 5/2020 |
| KR | 20140144795 | A | 12/2014 |
| KR | 20150031516 | A | 3/2015 |

* cited by examiner

MAGNETIC-ASSISTED SUCTION CUP MOUNTING ASSEMBLY AND METHOD

CROSS-REFERENCE TO RELATED APPLICATIONS

This application is a divisional application of U.S. application Ser. No. 18/139,006 filed Apr. 25, 2023, which claims the benefit of U.S. Provisional Application Ser. No. 63/334,547 filed on Apr. 25, 2022. Applicant incorporates by reference herein application Ser. Nos. 18/139,006 and 63/334,547 in their entireties.

BACKGROUND OF THE INVENTION

1. Field of the Invention

The present invention relates generally to releasable mounting systems, and more particularly relates to releasable suction cup mounting systems. The present invention also relates to releasable suction cup mounting systems for attachment to ferrous surfaces.

2. Description of the Related Art

Suction cups have been used commercially and industrially for several decades for many purposes to semi-permanently attach to a generally smooth, flat, non-porous surface. They are made from soft rubber and stick to the non-porous surface using the force of air pressure.

The suction cup has a working face made of an elastic, flexible, air-tight material and has a curved "cup" shape with concave center and flat spreading sides. When the center of the suction cup is pressed against the non-porous surface, air between the cup and the non-porous surface is expelled past the rim of the suction cup reducing the volume of the space between the suction cup and the surface. The resulting cavity developed between the suction cup and the flat, non-porous surface has little to no air in it because most of the fluid has been forced out of the inside of the suction cup, causing a lack of pressure. The pressure difference between the atmosphere on the outside of the suction cup and the low-pressure cavity on the inside of the suction cup keeps the suction cup adhered to the flat, non-porous surface.

By eliminating the pressure inside the suction cup, a vacuum is created which seals the suction cup tightly to the non-porous surface. However, suction cups lose vacuum over time. Atmospheric pressure always attempts to equalize itself and air naturally fills in any gaps. If air can work under the rim of the suction cup or through the surface, the pressure difference becomes reduced or eliminated and the suction cup will fall off, with the suction cup resuming its original, curved shape.

One technique that has been used to combat the loss of vacuum is to add a vacuum pump to the suction cup that can be used to restore the vacuum for an additional period of time. Commercially available suction cup with vacuum pump assemblies are available. One company providing such products is Woods Powr-Grip Co., Inc. of Laurel, Montana. Woods Powr-Grip has vacuum suction cup products having a check valve that allows repumping without the loss of remaining vacuum and also a red-line indicator on the pump rod to warn the user of any vacuum loss.

SUMMARY OF THE INVENTION

One aspect of the present invention of the magnetic-assisted suction cup mounting assembly for semi-permanently attaching to a ferrous material surface comprises a suction cup and at least one magnet spatially arranged with respect to the suction cup and providing additional fixturing of the suction cup to the ferrous material surface.

One aspect for a method for semi-permanently attaching the mounting assembly to the ferrous material surface comprises positioning a plurality of magnets in a raised position above a peripheral edge surface of a suction cup, positioning the suction cup on the ferrous material surface and drawing a vacuum between the suction cup and the ferrous material surface. Then repositioning the plurality of magnets to a lowered position in contact with the ferrous material surface.

BRIEF DESCRIPTION OF THE SEVERAL VIEWS OF THE DRAWINGS

The invention is better understood by reading the detailed description of embodiments which follows and by examining the accompanying drawings, in which.

DESCRIPTION OF THE PREFERRED EMBODIMENTS

Figure 1:
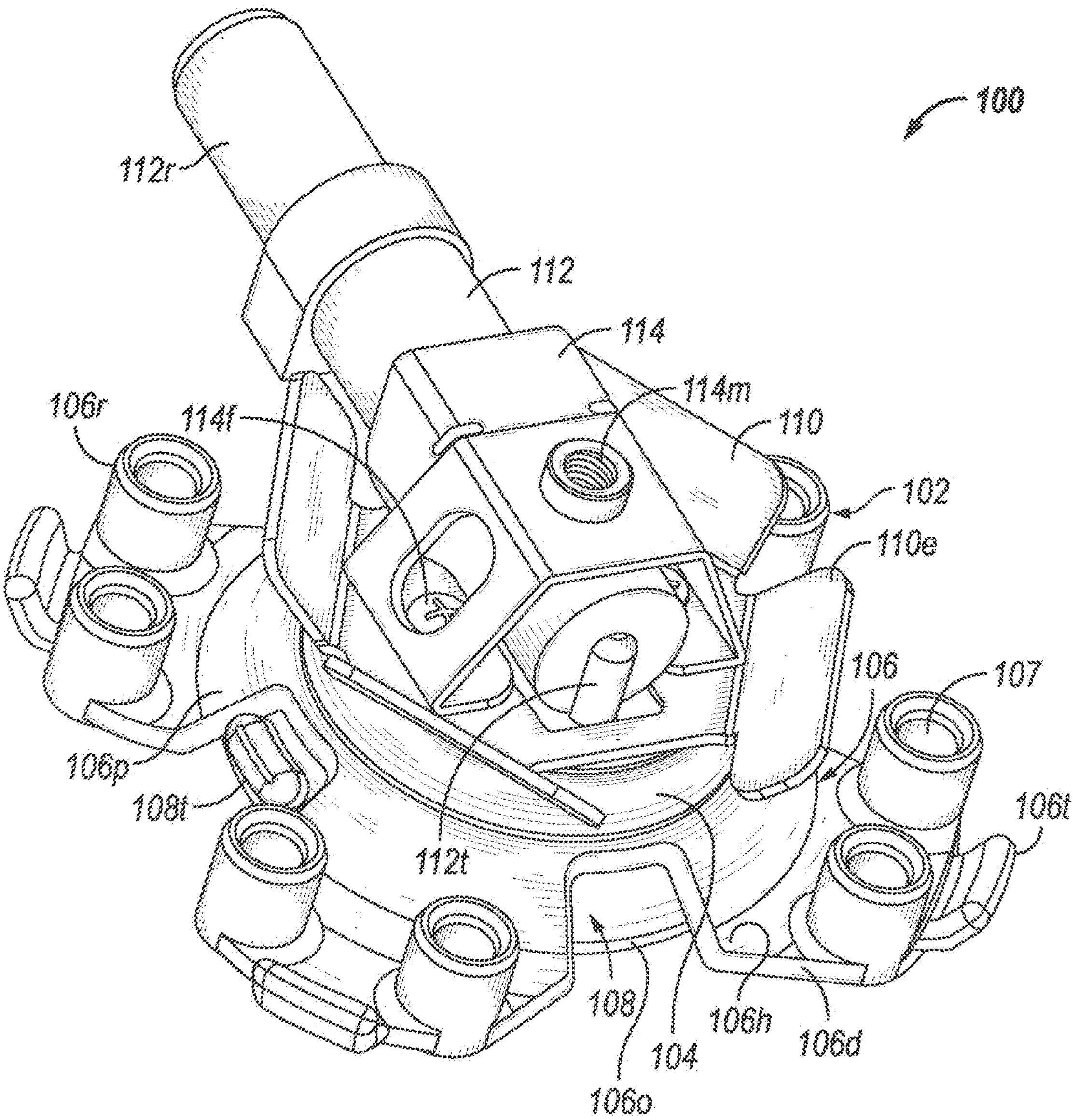
FIGS. 1 and 2 are perspective views of a first embodiment of a magnetic-assisted suction cup (MASC) mounting assembly.

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Referring to FIGS. 1-4, one embodiment of a magnetic-assisted suction cup (MASC) mounting assembly 100 is shown. Preferably, the MASC mounting assembly 100 comprises a retaining assembly 102 having a generally circular central frustoconical portion 104 having a planer upper surface 104*s* and a plurality of uniformly spaced fingers 106 extending downwardly and radially from the lower end of the frustoconical portion 104 and defining an opening 106*o* between adjacent fingers 106. In an alternate embodiment, the retaining assembly 102 may comprise a single finger 106. Preferably, the retaining assembly 102 is made of a durable elastomeric polymer, as for example silicone, and molded into shape. The fingers 106 include a distal portion 106*d* and a proximal portion 106*p* joined by a hinge 106*h*. The hinge 106*h* may be a flex hinge formed in the molding process. The distal portion 106*d* preferably has a substantially smooth planer lower surface 106*s*.

Preferably, the distal portion 106*d* of each finger 106 includes one or more receptacles 106*r* for receiving a magnet 107. The receptacles 106*r* may include a cover for enclosing the magnet 107 within the receptacle 106*r*. A tab 106*t* is preferably located at the distal end of each finger 106.

The MASC mounting assembly 100 also preferably includes a suction cup 108, a storage plate 110, a suction pump 112, and a pump bracket 114. The suction cup 108 is received within the frustoconical portion 104 and the downward radially extending proximal portions 106*p* of the fingers 106. The suction cup 108 may include one or more lift tabs 108*t* adjacent the outer perimeter or peripheral edge surface of the suction cup 108. The lift tabs 108*t* may be used to pull up on the suction cup 108 to release the pressure or suction between the suction cup 108 and a surface to which it is attached. Preferably, the lift tabs 108*t* are positioned within the openings 106*o* between adjacent fingers 106 for ease of access.

The storage plate 110 comprises a base 110*b* and a plurality of ears 110*e*. The base 110*b* is adapted to be positioned on the planer upper surface 104*s* of the frustoconical portion 104. The ears 110*e* preferably extend upwardly and outwardly from the base 110*b*. The ears 110*e*, or at least a portion of the ears 110*e*, are made of a ferromagnetic metal or include a ferromagnetic metal.

Preferably, the suction pump 112 includes a pump rod 112*r*, check valve and tubular insert 112*t*. The pump rod 112*r* is pumped to draw a vacuum between the suction cup 108 and the surface to which it is attached or being attached. The tubular insert 112*t* is in sealed engagement with the suction cup 108. The suction pump 112 may be used to provide and maintain the vacuum between the suction cup 108 and the surface to which it is attached and the check valve allows repumping without the loss of remaining vacuum.

The pump bracket 114 secures the suction pump 112 in place. Fasteners 114*f* may be used to secure the MASC mounting assembly 100 together. As one example, a pair of fasteners 114*f* may extend through holes in the pump bracket 114, storage plate 110, upper surface 104*s* of the frustoconical portion 104, and into the suction cup 108 to secure the components together. It is to be understood that other fastening arrangements are possible and within the scope of the present invention. Additionally, the pump bracket 114 includes an accessory mount 114*m* adapted for the attachment of or to other devices as will be discussed in detail later. The accessory mount 114*m* may be a threaded member, such as a nut or stud, or a clamp device.

It is to be understood that the suction pump 112 is preferred, but optional, in an alternate embodiment of the MASC mounting assembly 100.

Figure 2:
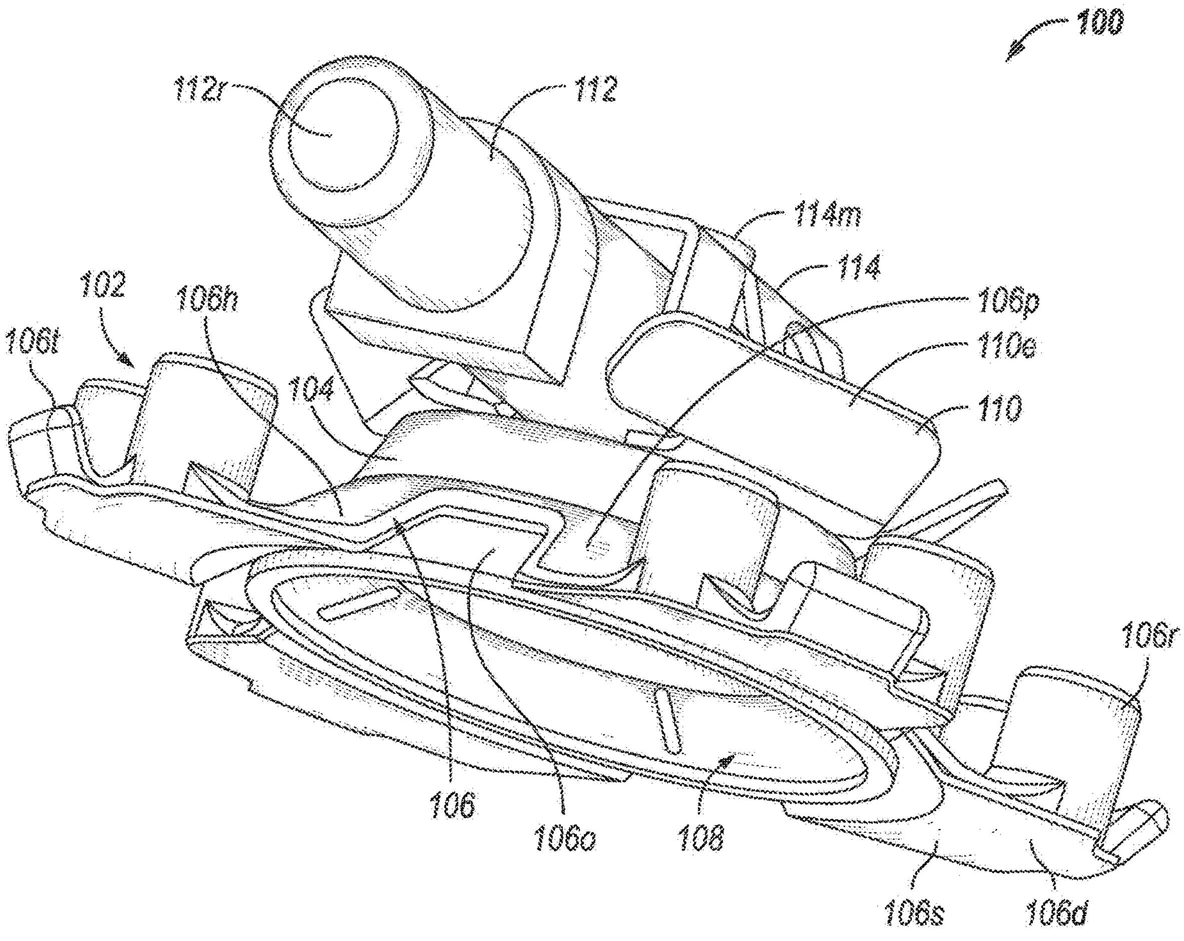
Figure 3:
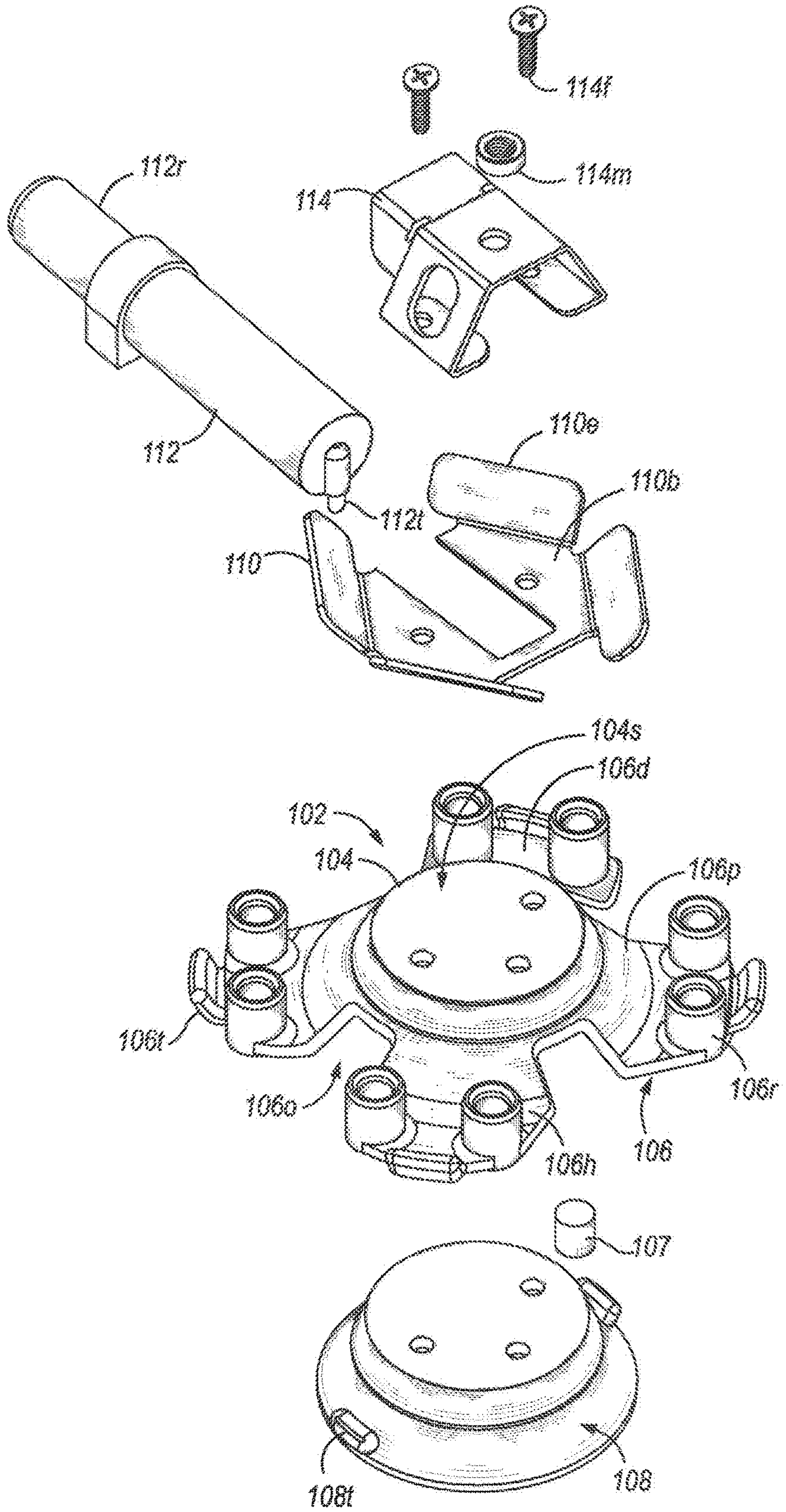
FIG. 3 is an exploded view of the MASC mounting assembly shown in FIGS. 1 and 2.
Figure 4:
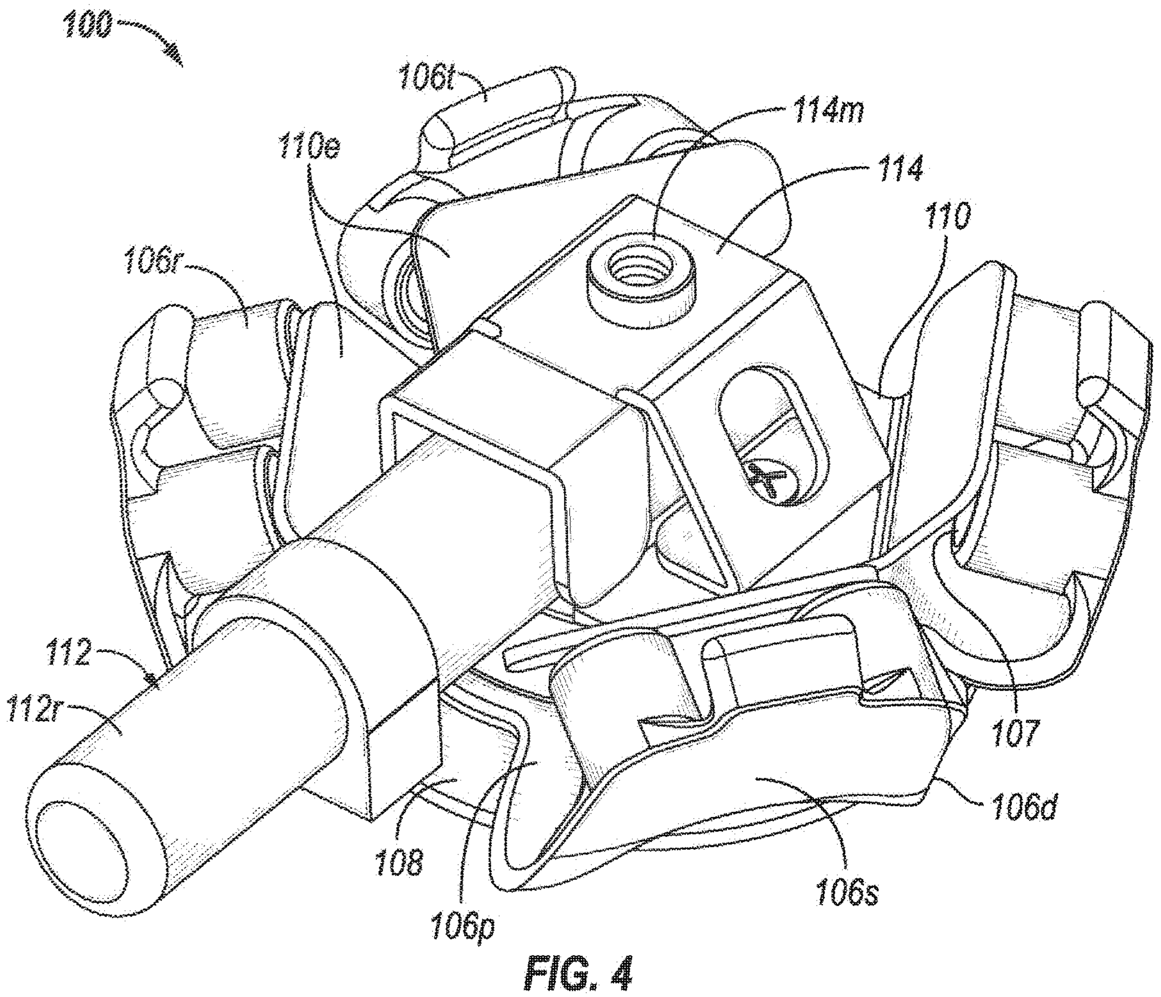
FIG. 4 is a perspective view showing the MASC mounting assembly with a distal end of a plurality of fingers in a parked position.

As shown in FIGS. 3 and 4, the number of ears 110*e* of the storage plate 110 is preferably the same as the number of fingers 106 of the retaining assembly 102. Referring to FIGS. 1, 2 and 4, the angle and placement of the ears 110*e* of the storage plate 110 in the assembled condition of the MASC mounting assembly 100 is such that the upper end of the magnet receptacles 106*r* is allowed to contact or be adjacent to the ears 110*e* when the distal portion 106*d* of the fingers 106 are rotated upwardly about the hinge 106*h*. As shown in FIG. 4, the distal portion 106*d* of the fingers 106 will remain in this "parked" or raised position as a result of magnetic attraction between the magnets 107 and the ferromagnetic ears 110*e*.

In a preferred embodiment, during the process of attaching the MASC mounting assembly 100 to a ferrous metal surface, the distal portion 106*d* of the fingers 106 are in the "parked" position to allow for ease of movement in positioning the MASC mounting assembly 100 on the ferrous metal surface. With the suction cup 108 positioned at the desired location on the ferrous metal surface, the pump 112 may be used to draw a vacuum between the suction cup 108 and the ferrous metal surface. Alternatively, pressure may be applied to the suction cup 108 to sealingly engage the ferrous metal surface and create a vacuum therebetween in the event no pump is present. Once the vacuum is drawn, the distal portion 106*d* of the fingers 106 are pulled away from the ears 110*e* and partially rotated to the lowered position in which the magnets 107 surrounding the suction cup 108 are brought in proximity to and magnetically attached or attracted to the ferrous metal surface that the suction cup 108 is attached to. The steps may be reversed to remove the MASC mounting assembly 100 from the ferrous metal surface.

One of the aspects of the MASC mounting assembly 100 is the suction cup 108 with vacuum pump 112 in combination with securing assistance via the magnets 107. It is known that suction cups 108 lose vacuum over time and need to be reinstalled or pumped to restore the vacuum for an additional period of time. The MASC mounting assembly 100 can be used to mount an object to a ferrous metal surface with the magnets 107 providing secondary and/or additional support to the suction cup 108—whether the suction cup 108 is at full, partial or no vacuum. The MASC mounting assembly 100 has utility in many applications and markets that need additional support to suction-based mounting since suction can fail after some period of time.

It is to be understood that the MASC mounting assembly 100 may be used singly or in combination with one or more other MASC mounting assemblies 100.

There are several other embodiments and variations of the MASC mounting assembly 100. A few additional embodiments are shown in FIGS. 5-10 and described below. Many of the features of the additional embodiments of the MASC mounting assembly are the same or very similar to the features of the MASC mounting assembly 100 and such features are referred to by the same reference number. The following descriptions will primarily focus on the features, methods or principles that are modified, different or new with respect to the MASC mounting assembly 100. It is to be understood that variations to the shown embodiments are contemplated by the inventors and within the scope of the present invention.

Figure 5:
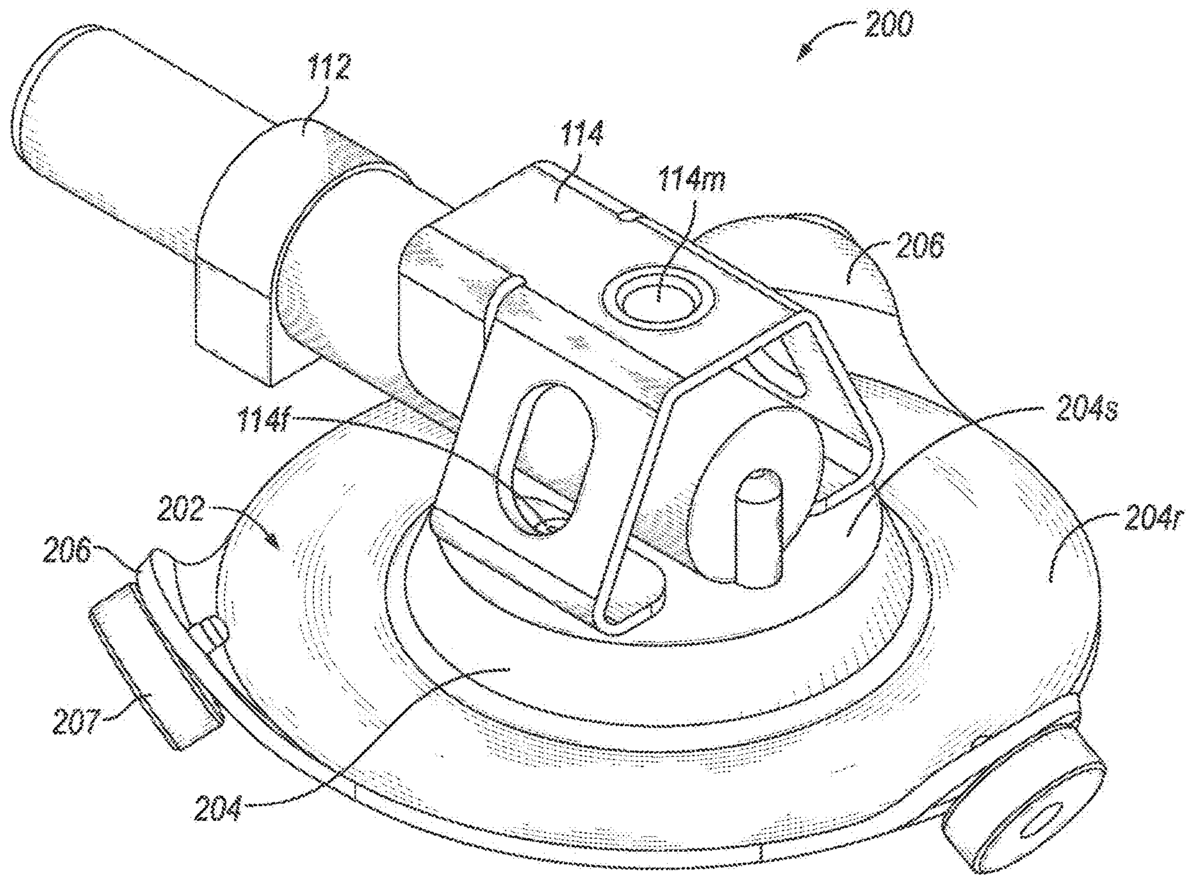
FIG. 5 is a perspective view of a second embodiment of the MASC mounting assembly.

A second embodiment of the MASC mounting assembly, referred to generally as 200, is shown in FIG. 5. Preferably, the MASC mounting assembly 200 comprises a retaining assembly 202 having a generally circular central frustoconical portion 204 having a planer upper surface 204*s* and a lower radially-extending circular ring 204*r*. The circular ring 204*r* including a plurality of spatially-separated hinged fingers 206 extending outwardly.

Preferably, the retaining assembly 202 is made of a durable elastomeric polymer, as for example silicone, and molded into shape. Each of the hinged fingers 206 has a magnet 207 connected to it, preferably to a lower surface of the hinged fingers 206. Preferably, the hinged fingers 206 have a biased raised position in which the fingers 206 and the magnets 207 are above the remainder of the circular ring 204*r* as shown in FIG. 5.

The MASC mounting assembly 200 also includes a bracket 114 having an accessory mount 114*m* and a suction cup (not shown) similar to the suction cup 108 shown in FIGS. 1-4; however, preferably without the lift tabs 108*t*. Alternatively, the retaining assembly 202 may comprise the suction cup. Optionally, the MASC mounting assembly 200 also includes a suction pump 112. The suction cup is received within the frustoconical portion 204. The pair of fasteners 114*f* may extend through holes in the bracket 114, upper surface 204*s* of the frustoconical portion 204, and into the suction cup to secure the components together.

In a preferred embodiment, during the process of attaching the MASC mounting assembly 200 to a ferrous metal surface, the fingers 206 are in the biased raised position. With the suction cup positioned at the desired location on the ferrous metal surface, the pump 112 may be used to draw a vacuum between the suction cup and the ferrous metal surface. Alternatively, pressure may be applied to the suction cup to sealingly engage the ferrous metal surface and create a vacuum therebetween in the event no pump is present. Once the vacuum is drawn, the hinged fingers 206 are partially rotated or pivoted towards to a lowered position in which the magnets 207 surrounding the suction cup are brought in proximity to and magnetically attached or attracted to the ferrous metal surface that the suction cup is attached to. The steps may be reversed to remove the MASC mounting assembly 200 from the ferrous metal surface.

Figure 6:
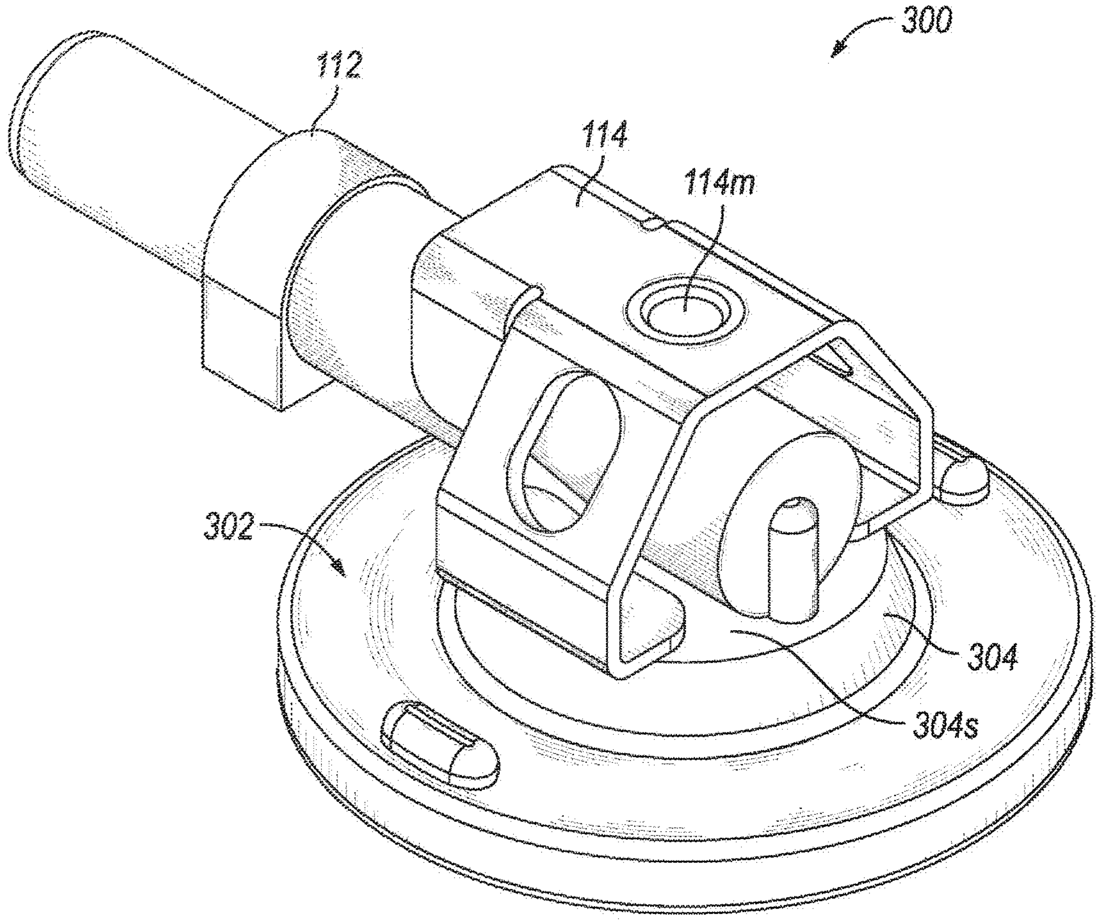
FIG. 6 is a perspective view of a third embodiment of the MASC mounting assembly.
Figure 7:
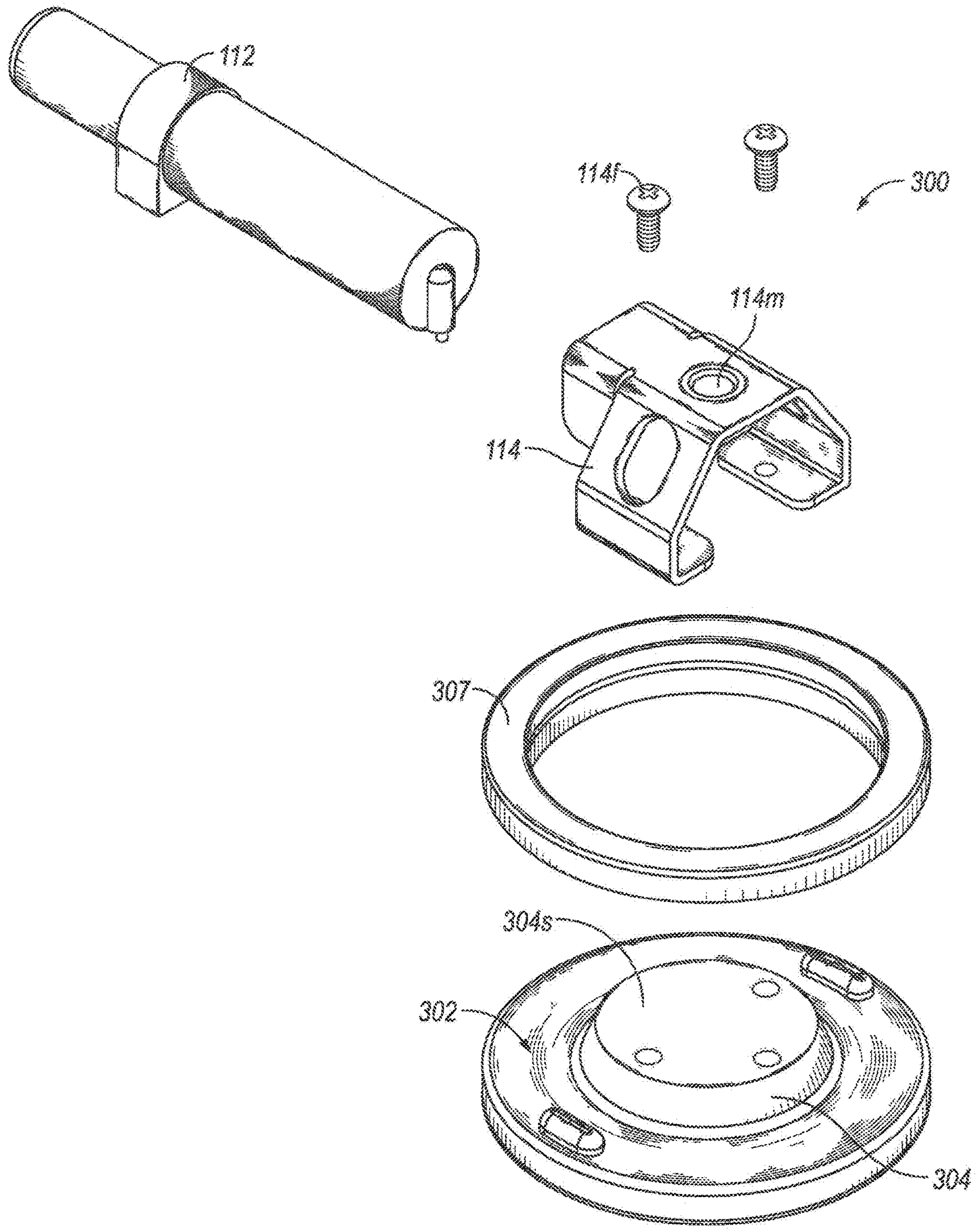
FIG. 7 is an exploded view of the MASC mounting assembly shown in FIG. 6.

A third embodiment of the MASC mounting assembly, referred to generally as 300, is shown in FIGS. 6 and 7. Preferably, the MASC mounting assembly 300 utilizes a single ring magnet 307 that is embedded or attached to a retaining assembly 302 surrounding a suction cup (not shown). Alternatively, the retaining assembly 302 may comprise the suction cup. Alternatively, the retaining assembly 302 may be made of a magnetic elastomer in place of the ring magnet 307. As discussed with previous embodiments, optionally the MASC mounting assembly 300 also includes a suction pump 112. The suction cup is received within the frustoconical portion 304. The pair of fasteners 114*f* may extend through holes in the bracket 114, upper surface 304*s* of the frustoconical portion 304, and into the suction cup to secure the components together. In this embodiment, the ring magnet 307 is magnetically attracted to the ferrous surface upon placement of the MASC mounting assembly 300 on the ferrous surface.

Figure 8:
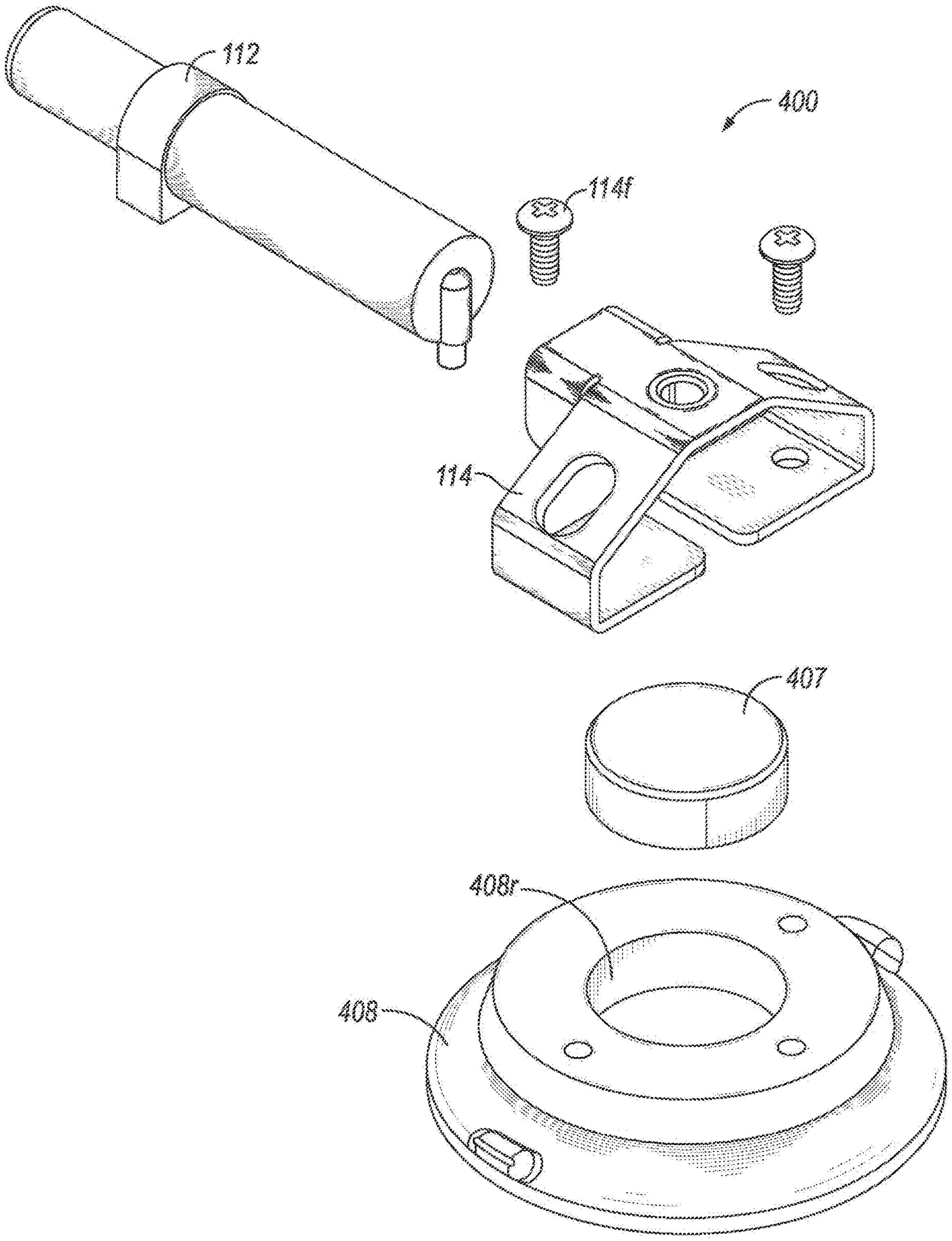
FIG. 8 is an exploded view of a fourth embodiment of the MASC mounting assembly.

A fourth embodiment of the MASC mounting assembly, referred to generally as 400, is shown in FIG. 8. Preferably, the MASC mounting assembly 400 utilizes a single magnet 407 that is attached to a suction cup 408 in a central upper receptacle 408*r*. As discussed with previous embodiments, optionally the MASC mounting assembly 400 includes a suction pump 112 and a pair of fasteners 114*f* may extend through holes in the bracket 114, and into the suction cup 408 to secure the components together. Upon placement of the MASC mounting assembly 400 on the ferrous surface, the central portion of the suction cup 408 with the magnet 407 is drawn and attached to the ferrous surface and then the pump 112 may be used to develop the vacuum between the suction cup 408 and the ferrous surface.

Figure 9:
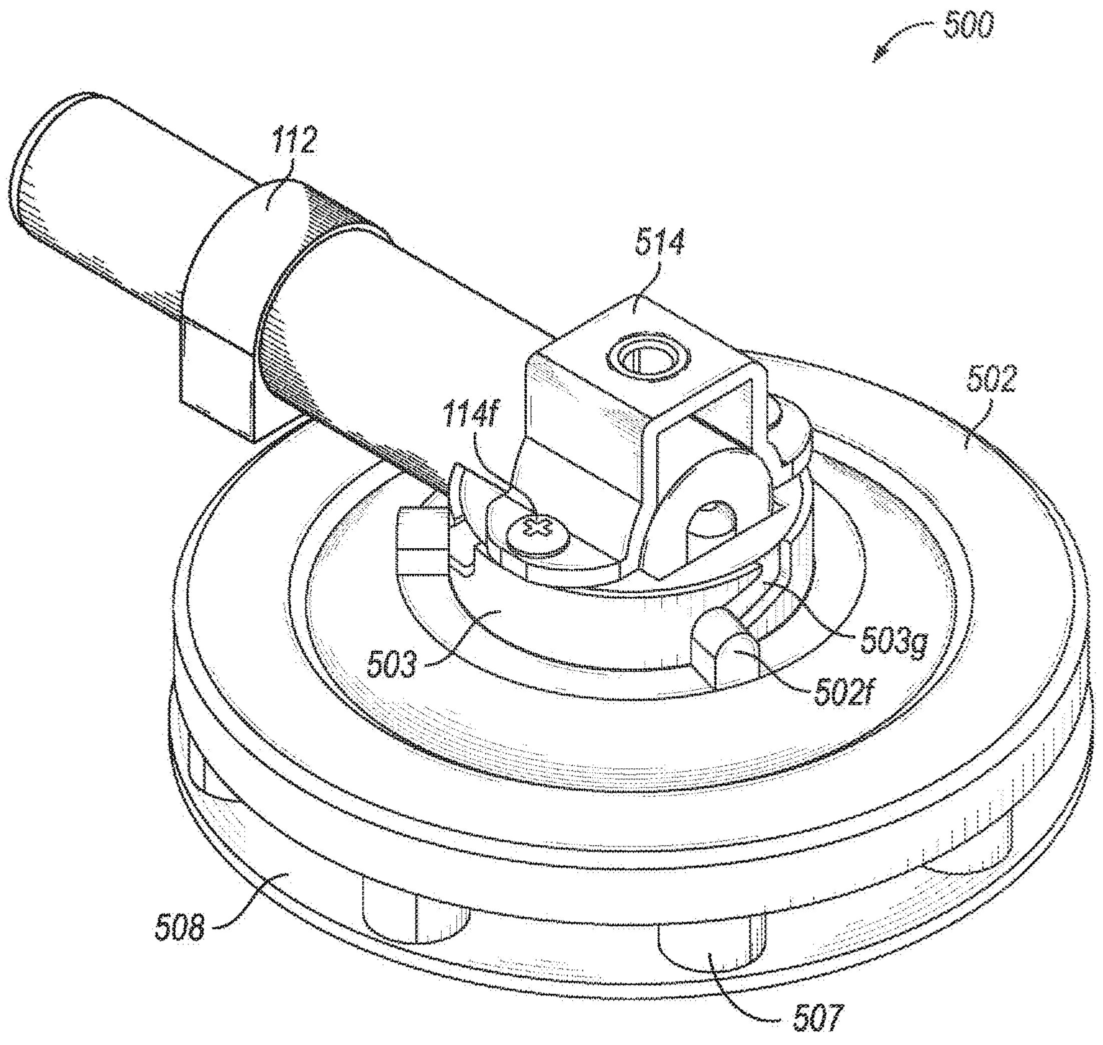
FIG. 9 is a perspective view of a fifth embodiment of the MASC mounting assembly.
Figure 10:
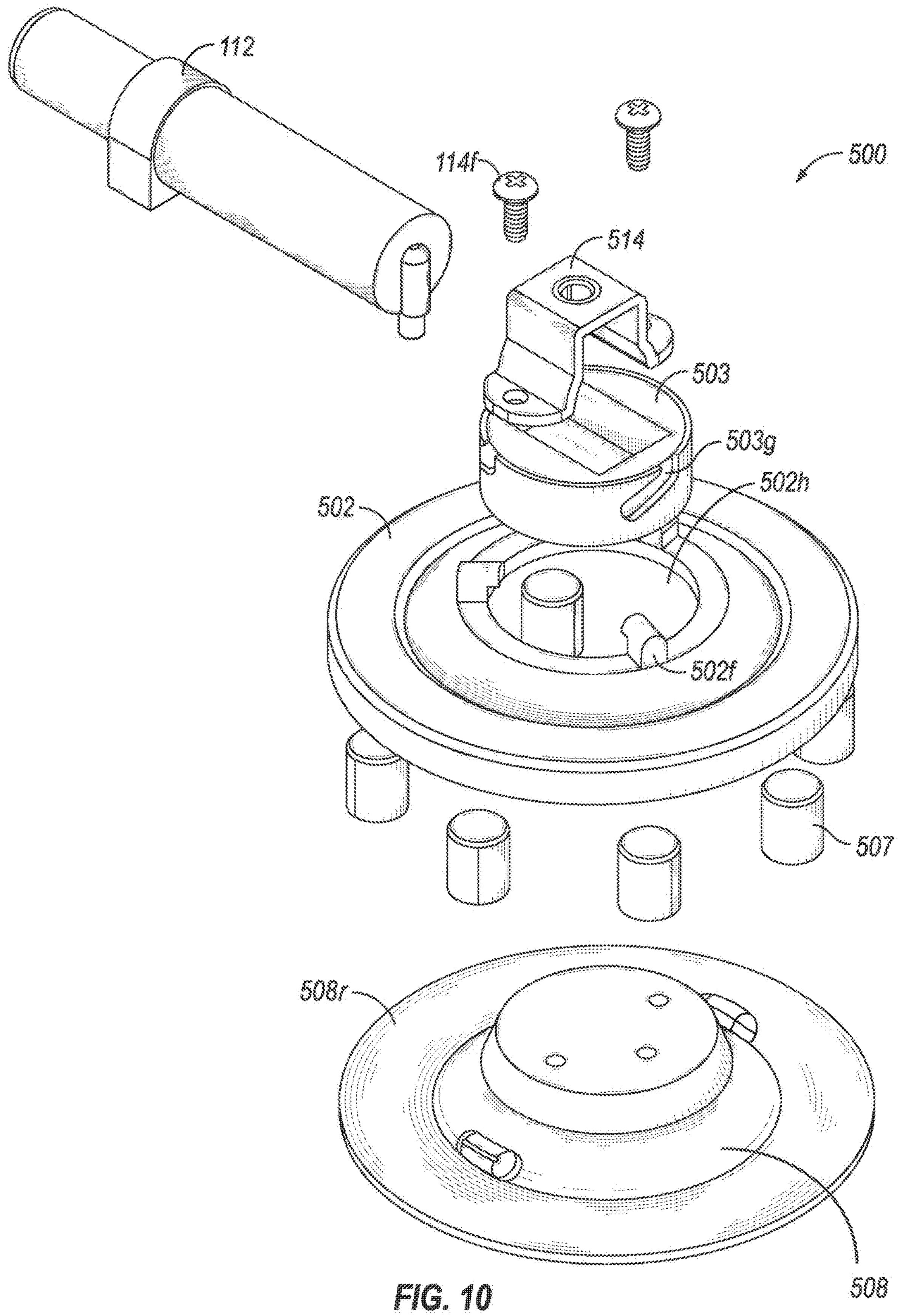
FIG. 10 is an exploded view of the MASC mounting assembly shown in FIG. 9.

A fifth embodiment of the MASC mounting assembly, referred to generally as 500, is shown in FIGS. 9 and 10. Preferably, the MASC mounting assembly 500 utilizes a plurality of magnets 507 uniformly spaced in a circular pattern and attached to an upper retaining assembly 502. The upper retaining assembly 502 includes a central opening 502*h* for receiving a central hub 503 having a plurality of exterior slanted grooves 503*g* adapted to receive and cooperate with a plurality of follower members 502*f* of the retaining assembly 502. The retaining assembly 502 with magnets 507 is allowed to partially rotate relative to the suction cup 508 and central hub 503. Preferably, the suction cup 508 includes a radially-extending ring 508*r*.

Optionally the MASC mounting assembly 500 includes a suction pump 112 and a pair of fasteners 114*f* may extend through holes in a pump bracket 514 and the central hub 503, and into the suction cup 508 to secure the components together.

When placing the MASC mounting assembly 500 on a ferrous surface, the retaining assembly 502 with magnets 507 is preferably in a raised position in which the magnets are not in contact with the suction cup 508. This is accomplished by partially rotating the retaining assembly 502 relative to the central hub 503 in the counter-clockwise direction. Upon placement of the suction cup 508 in contact with the ferrous surface and drawing a vacuum therebetween, the retaining assembly 502 with magnets 507 is rotated in the clockwise direction to the lower position as shown in FIG. 9 with the magnets in contact with the suction cup 508.

It is to be further understood that this invention has numerous applications that may not require one or more of the numerous features described below and such embodiments remain within the scope of the present invention.

NOMENCLATURE magnetic-assisted suction cup (MASC) mounting assembly 100 retaining assembly 102 frustoconical portion 104
planer upper surface 104*s*
fingers 106
distal portion 106*d*
hinge 106*h*
opening 106*o*
proximal portion 106*p*
receptacles 106*r*
planer lower surface 106*s*
tab 106*t*
magnet 107
suction cup 108
lift tabs 108*t*
storage plate 110
base 110*b*
ears 110*e*
suction pump 112
pump rod 112*r*
tubular insert 112*t*
pump bracket 114
fasteners 114*f*
accessory mount 114*m*
MASC mounting assembly 200
retaining assembly 202
frustoconical portion 204
circular ring 204*r*
planer upper surface 204*s*
hinged fingers 206
magnets 207
MASC mounting assembly 300
retaining assembly 302
frustoconical portion 304
upper surface 304*s*
ring magnet 307
MASC mounting assembly 400
magnet 407
suction cup 408
upper receptacle 408*r*
MASC mounting assembly 500
retaining assembly 502
follower members 502*f*
central opening 502*h*
central hub 503
exterior slanted grooves 503*g*
magnets 507
suction cup 508
radially-extending ring 508*r*
pump bracket 514

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A magnetic-assisted suction cup mounting assembly for semi-permanently attaching to a ferrous material surface, comprising:

a retaining assembly comprising a central frustoconical portion having an upper surface and a plurality of fingers;

at least one magnet attached to each finger; and a suction cup having a peripheral edge surface received within the frustoconical portion, wherein each finger includes a distal portion having a lowered position in which the distal portion extends beyond the peripheral edge surface of the suction cup.

2. The magnetic-assisted suction cup mounting assembly of claim 1, further comprising:

a storage plate attached to the retaining assembly, the storage plate having one or more ears, at least a portion of each ear including a ferromagnetic metal, wherein the distal portion of each finger has a raised position and a lowered position, in the raised position the at least one magnet magnetically contacts an ear of the storage plate, and in the lowered position the at least one magnet magnetically contacts the ferrous material surface.

3. The magnetic-assisted suction cup mounting assembly of claim 2, further comprising:

a suction pump secured to the storage plate, the suction pump having a pump rod, a check valve and a tubular insert in communication with the suction cup, wherein the pump rod is pumped to draw a vacuum between the suction cup and the ferrous material surface.

4. The magnetic-assisted suction cup mounting assembly of claim 1, wherein each finger includes a downward radially extending proximal portion joined to the distal portion via a hinge.

5. The magnetic-assisted suction cup mounting assembly of claim 4, wherein the plurality of fingers are spatially arranged and define an opening between adjacent fingers;

the suction cup having at least one lift tab adjacent the peripheral edge of the suction cup, wherein the at least one lift tab is positioned within one of the openings between adjacent fingers.

6. The magnetic-assisted suction cup mounting assembly of claim 1, further comprising an accessory mount connected to the retaining assembly.

7. The magnetic-assisted suction cup mounting assembly of claim 6, wherein the accessory mount comprises a threaded member.

8. The magnetic-assisted suction cup mounting assembly of claim 1, wherein the distal portion of the plurality of fingers has a substantially smooth planer lower surface.

9. The magnetic-assisted suction cup mounting assembly of claim 1, wherein the retaining assembly is made of a durable elastomeric polymer.

10. The magnetic-assisted suction cup mounting assembly of claim 1, wherein each finger includes at least one receptacle for receiving the at least one magnet.

11. A magnetic-assisted suction cup mounting assembly for semi-permanently attaching to a ferrous material surface, comprising:

a retaining assembly comprising a circular frustoconical portion having an upper surface and a plurality of fingers;

at least one magnet attached to each finger; and a suction cup at least partially received within the frustoconical portion, wherein each finger includes a distal portion having a lowered position in which the distal portion is in contact with or adjacent to the ferrous material surface.

12. The magnetic-assisted suction cup mounting assembly of claim 11, further comprising a suction pump connected to the retaining assembly and in communication with the suction cup.

13. The magnetic-assisted suction cup mounting assembly of claim 12, wherein the suction pump comprises a pump rod, a check valve and a tubular insert in communication with the suction cup, wherein the pump rod is pumped to draw a vacuum between the suction cup and the ferrous material surface.

14. The magnetic-assisted suction cup mounting assembly of claim 11, wherein the at least one magnet attached to each finger is attached to the distal portion of each finger, and wherein the distal portion of each finger has a raised position in which the at least one magnet remains distant from the ferrous material surface as the suction cup attaches to the ferrous material surface.

15. The magnetic-assisted suction cup mounting assembly of claim 11, further comprising:

a plate attached to the upper surface of the retaining assembly, the plate having one or more ears, at least a portion of each ear including a ferromagnetic metal, wherein the distal portion of each finger has a raised position and a lowered position, in the raised position the at least one magnet magnetically attaches to an ear of the storage plate, and in the lowered position the at least one magnet magnetically attaches to the ferrous material surface.

* * * * *